United States Patent
Nagasaka et al.

(10) Patent No.: US 11,189,313 B2
(45) Date of Patent: *Nov. 30, 2021

(54) MAGNETIC RECORDING MEDIUM UTILIZING ADJACENT UNDERLAYER AND MAGNETIC LAYER HAVING PARTICULAR COMPOSITIONS, MAGNETIC STORAGE APPARATUS, AND METHOD OF MANUFACTURING MAGNETIC RECORDING MEDIUM

(71) Applicant: SHOWA DENKO K.K., Tokyo (JP)

(72) Inventors: Koichi Nagasaka, Chiba (JP); Takayuki Fukushima, Chiba (JP); Lei Zhang, Chiba (JP); Chen Xu, Chiba (JP); Hisato Shibata, Chiba (JP); Takehiro Yamaguchi, Chiba (JP); Hiroshi Koyanagi, Chiba (JP); Yuji Umemoto, Chiba (JP)

(73) Assignee: SHOWA DENKO K.K., Tokyo (JP)

( * ) Notice: Subject to any disclaimer, the term of this patent is extended or adjusted under 35 U.S.C. 154(b) by 0 days.

This patent is subject to a terminal disclaimer.

(21) Appl. No.: 17/141,367

(22) Filed: Jan. 5, 2021

(65) Prior Publication Data

US 2021/0256998 A1 Aug. 19, 2021

(30) Foreign Application Priority Data

Feb. 13, 2020 (JP) .............................. JP2020-022463

(51) Int. Cl.
| | | |
|---|---|---|
| G11B 5/70 | (2006.01) | |
| G11B 5/706 | (2006.01) | |
| G11B 5/73 | (2006.01) | |
| G11B 5/33 | (2006.01) | |
| G11B 5/851 | (2006.01) | |

(Continued)

(52) U.S. Cl.
CPC ............ *G11B 5/73919* (2019.05); *G11B 5/33* (2013.01); *G11B 5/672* (2021.05); *G11B 5/70615* (2013.01); *G11B 5/70621* (2013.01); *G11B 5/716* (2013.01); *G11B 5/7361* (2019.05); *G11B 5/851* (2013.01)

(58) Field of Classification Search
None
See application file for complete search history.

(56) References Cited

U.S. PATENT DOCUMENTS

| | | | |
|---|---|---|---|
| 10,008,220 B2 | 6/2018 | Fukushima et al. | |
| 10,923,150 B2 * | 2/2021 | Moriya | G11B 5/8404 |
| 11,043,238 B1 * | 6/2021 | Yamaguchi | G11B 5/667 |

(Continued)

FOREIGN PATENT DOCUMENTS

| | | |
|---|---|---|
| JP | 2014-041682 | 3/2014 |
| JP | 2017-224371 | 12/2017 |

*Primary Examiner* — Jefferson A Evans
(74) *Attorney, Agent, or Firm* — IPUSA, PLLC

(57) ABSTRACT

A magnetic recording medium includes a substrate, an underlayer provided above the substrate, and a magnetic layer provided on and in contact with the underlayer. The underlayer includes a compound represented by a general formula $MgO_{(1-x)}$, where x falls within a range of 0.07 to 0.25. The magnetic layer includes an alloy having a $L1_0$ structure, and the alloy having the $L1_0$ structure includes one or more elements selected from a group consisting of Al, Si, Ga, and Ge.

14 Claims, 4 Drawing Sheets

(51) Int. Cl.
*G11B 5/716* (2006.01)
*G11B 5/66* (2006.01)

(56) References Cited

U.S. PATENT DOCUMENTS

| | | | | |
|---|---|---|---|---|
| 2007/0072011 A1* | 3/2007 | Li | ............ | G11B 5/746 |
| | | | | 428/828.1 |
| 2012/0100396 A1* | 4/2012 | Uchida | ............ | C23C 14/3414 |
| | | | | 428/828 |
| 2016/0293198 A1* | 10/2016 | Uchida | ............ | G11B 5/653 |
| 2016/0358622 A1* | 12/2016 | Arora | ............ | G11B 5/855 |
| 2017/0140784 A1* | 5/2017 | Sukegawa | ............ | G11B 5/739 |
| 2017/0221508 A1* | 8/2017 | Kryder | ............ | G11B 5/1278 |
| 2017/0365286 A1* | 12/2017 | Uchida | ............ | G11B 5/70615 |
| 2019/0287563 A1* | 9/2019 | Kataoka | ............ | G11B 5/852 |
| 2021/0201947 A1* | 7/2021 | Fukushima | ............ | G11B 5/73917 |

* cited by examiner

FIG. 4

| | Sputtering Gas | | | | Sputtering Gas Pressure [Pa] | x of Uppermost Underlayer | First Magnetic Layer | Half Width [°] of (200) Peak of FePt Alloy |
|---|---|---|---|---|---|---|---|---|
| | Kind of Gas | Content [vol%] | Kind of Gas | Content [vol%] | | | | |
| I1-1 | Ar | 100 | - | - | 0.1 | 0.12 | 60mol%(47.5at%Fe47.5at%Pt5at%Ge)-40mol%C | 6.6 |
| I1-2 | Ar | 100 | - | - | 0.3 | 0.10 | 60mol%(47.5at%Fe47.5at%Pt5at%Ge)-40mol%C | 6.8 |
| I1-3 | Ar | 100 | - | - | 0.5 | 0.09 | 60mol%(47.5at%Fe47.5at%Pt5at%Ge)-40mol%C | 6.8 |
| I2-1 | Ar | 100 | - | - | 0.1 | 0.12 | 60mol%(47.5at%Fe47.5at%Pt5at%Si)-40mol%C | 5.5 |
| I2-2 | Ar | 100 | - | - | 0.3 | 0.10 | 60mol%(47.5at%Fe47.5at%Pt5at%Si)-40mol%C | 5.6 |
| I2-3 | Ar | 100 | - | - | 0.5 | 0.09 | 60mol%(47.5at%Fe47.5at%Pt5at%Si)-40mol%C | 5.7 |
| I3-1 | Ar | 100 | - | - | 0.1 | 0.12 | 60mol%(47.5at%Fe47.5at%Pt5at%Al)-40mol%C | 5.6 |
| I3-2 | Ar | 100 | - | - | 0.3 | 0.10 | 60mol%(47.5at%Fe47.5at%Pt5at%Al)-40mol%C | 5.7 |
| I3-3 | Ar | 100 | - | - | 0.5 | 0.09 | 60mol%(47.5at%Fe47.5at%Pt5at%Al)-40mol%C | 5.7 |
| I4-1 | Ar | 99 | H₂ | 1 | 3 | 0.12 | 60mol%(47.5at%Fe47.5at%Pt5at%Ge)-40mol%C | 6.5 |
| I4-2 | Ar | 96 | H₂ | 4 | 3 | 0.13 | 60mol%(47.5at%Fe47.5at%Pt5at%Ge)-40mol%C | 6.3 |
| I4-3 | Ar | 90 | H₂ | 10 | 3 | 0.15 | 60mol%(47.5at%Fe47.5at%Pt5at%Ge)-40mol%C | 6.1 |
| I4-4 | Ar | 80 | H₂ | 20 | 3 | 0.20 | 60mol%(47.5at%Fe47.5at%Pt5at%Ge)-40mol%C | 6.1 |
| I5-1 | Ar | 99 | H₂ | 1 | 3 | 0.12 | 60mol%(47.5at%Fe47.5at%Pt5at%Si)-40mol%C | 5.0 |
| I5-2 | Ar | 96 | H₂ | 4 | 3 | 0.13 | 60mol%(47.5at%Fe47.5at%Pt5at%Si)-40mol%C | 4.8 |
| I5-3 | Ar | 90 | H₂ | 10 | 3 | 0.15 | 60mol%(47.5at%Fe47.5at%Pt5at%Si)-40mol%C | 4.7 |
| I5-4 | Ar | 80 | H₂ | 20 | 3 | 0.20 | 60mol%(47.5at%Fe47.5at%Pt5at%Si)-40mol%C | 4.7 |
| I6-1 | Ar | 99 | H₂ | 1 | 3 | 0.12 | 60mol%(47.5at%Fe47.5at%Pt5at%Al)-40mol%C | 5.3 |
| I6-2 | Ar | 96 | H₂ | 4 | 3 | 0.13 | 60mol%(47.5at%Fe47.5at%Pt5at%Al)-40mol%C | 5.1 |
| I6-3 | Ar | 90 | H₂ | 10 | 3 | 0.15 | 60mol%(47.5at%Fe47.5at%Pt5at%Al)-40mol%C | 5.0 |
| I6-4 | Ar | 80 | H₂ | 20 | 3 | 0.20 | 60mol%(47.5at%Fe47.5at%Pt5at%Al)-40mol%C | 5.0 |
| I7-1 | Ar | 99 | H₂ | 1 | 3 | 0.12 | 60mol%(47.5at%Fe47.5at%Pt5at%Ga)-40mol%C | 6.5 |
| I7-2 | Ar | 96 | H₂ | 4 | 3 | 0.13 | 60mol%(47.5at%Fe47.5at%Pt5at%Ga)-40mol%C | 6.4 |
| I7-3 | Ar | 90 | H₂ | 10 | 3 | 0.15 | 60mol%(47.5at%Fe47.5at%Pt5at%Ga)-40mol%C | 6.2 |
| I7-4 | Ar | 80 | H₂ | 20 | 3 | 0.20 | 60mol%(47.5at%Fe47.5at%Pt5at%Ga)-40mol%C | 6.2 |
| C1-1 | Ar | 100 | - | - | 3 | 0.05 | 60mol%(47.5at%Fe47.5at%Pt5at%Ge)-40mol%C | 7.6 |
| C1-2 | Ar | 100 | - | - | 7 | 0 | 60mol%(47.5at%Fe47.5at%Pt5at%Ge)-40mol%C | 8.0 |
| C2-1 | Ar | 100 | - | - | 3 | 0.05 | 60mol%(47.5at%Fe47.5at%Pt5at%Si)-40mol%C | 7.2 |
| C2-2 | Ar | 100 | - | - | 7 | 0 | 60mol%(47.5at%Fe47.5at%Pt5at%Si)-40mol%C | 7.7 |
| C3-1 | Ar | 100 | - | - | 3 | 0.05 | 60mol%(47.5at%Fe47.5at%Pt5at%Al)-40mol%C | 7.4 |
| C3-2 | Ar | 100 | - | - | 7 | 0 | 60mol%(47.5at%Fe47.5at%Pt5at%Al)-40mol%C | 7.9 |
| C4-1 | Ar | 100 | - | - | 3 | 0.05 | 60mol%(47.5at%Fe47.5at%Pt5at%Ga)-40mol%C | 7.6 |
| C4-2 | Ar | 100 | - | - | 7 | 0 | 60mol%(47.5at%Fe47.5at%Pt5at%Ga)-40mol%C | 8.0 |
| C5-1 | Ar | 100 | - | - | 3 | 0.05 | 60mol%(50at%Fe50at%Pt)-40mol%C | 8.1 |
| C5-2 | Ar | 100 | - | - | 7 | 0 | 60mol%(50at%Fe50at%Pt)-40mol%C | 8.5 |

MAGNETIC RECORDING MEDIUM UTILIZING ADJACENT UNDERLAYER AND MAGNETIC LAYER HAVING PARTICULAR COMPOSITIONS, MAGNETIC STORAGE APPARATUS, AND METHOD OF MANUFACTURING MAGNETIC RECORDING MEDIUM

CROSS-REFERENCE TO RELATED APPLICATIONS

This application is based upon and claims priority to Japanese Patent Application No. 2020-022463 filed on Feb. 13, 2020, the entire contents of which are incorporated herein by reference.

BACKGROUND OF THE INVENTION

1. Field of the Invention

The present invention relates to a magnetic recording medium, a magnetic storage apparatus, and a method of manufacturing the magnetic recording medium.

2. Description of the Related Art

The thermal assist recording method, which reduces the coercivity of the magnetic recording medium and records magnetic information by locally heating the surface of the magnetic recording medium by irradiating near-field light or the like on the magnetic recording medium, is regarded as a promising next generation recording method that can realize a surface recording density on the order of 1 Tbit/inch$^2$. When the thermal assist recording method is employed, the magnetic information can easily be recorded on the magnetic recording medium having a coercivity of several tens of kOe at room temperature, by the recording magnetic field of a magnetic head. For this reason, a material having a high crystalline magnetic anisotropy constant (or Ku value) on the order of $10^6$ J/m$^3$ (that is, a high-Ku material) can be used for the magnetic layer. As a result, the size of magnetic particles forming the magnetic layer can be reduced to a particle diameter of 6 nm or less, while maintaining the thermal stability.

Known high-Ku materials include alloys having a $L1_0$ structure, such as FePt alloys (Ku~$7\times10^6$ J/m$^3$), CoPt alloys (Ku~$5\times10^6$ J/m$^3$), or the like.

In order to improve the surface recording density of the magnetic recording medium employing the thermal assist recording method (hereinafter simply referred to as a "thermal assist magnetic recording medium"), it is necessary to improve the electromagnetic conversion characteristics of the thermal assist magnetic recording medium, by improving the crystal orientation of the magnetic layer, reducing the size of the magnetic particles forming the magnetic layer, and reducing the exchange coupling between the magnetic particles.

For example, when a FePt alloy layer is used as the magnetic layer, the FePt alloy layer needs to have a (001) orientation in order to improve the crystal orientation of the magnetic layer. For this reason, it is desirable to use a MgO layer having a (100) orientation, as an underlayer underneath the magnetic layer. Because the (100) face of MgO is lattice matched with a high degree to the (001) face of the FePt alloy having the $L1_0$ structure, the FePt alloy layer can be made to have the (001) orientation by depositing the FePt alloy layer on the MgO layer.

For example, Japanese Laid-Open Patent Publication No. 2017-224371 describes a magnetic recording medium including a substrate, an underlayer, and a magnetic layer having the $L1_0$ structure and the (001) orientation, which are laminated in this order. The magnetic layer includes a first magnetic layer and a second magnetic layer, and the first magnetic layer is located closer to the substrate than the second magnetic layer. The first magnetic layer has a granular structure including C at grain boundaries of the magnetic particles. The second magnetic layer has a granular structure including an oxide or a nitride at the grain boundaries of the magnetic particles. The second magnetic layer further includes one or more elements selected from a group consisting of Mg, Ni, Zn, Ge, Pd, Sn, Ag, Re, Au, and Pb.

The demand to improve the surface recording density of the magnetic recording medium continues, and there are demands to improve the electromagnetic conversion characteristics of the magnetic recording medium. In order to satisfy such demands, it is necessary to improve the regularity of the magnetic layer, to improve the orientation of the magnetic layer.

Hence, in order to improve the (001) orientation of the alloy having the $L1_0$ structure, it is conceivable to add one or more elements selected from the group consisting of Mg, Ni, Zn, Ge, Pd, Sn, Ag, Re, Au, and Pb to the magnetic layer. However, when such a magnetic layer is deposited on the MgO layer, interdiffusion occurs between the one or more elements selected from the group consisting of Mg, Ni, Zn, Ge, Pd, Sn, Ag, Re, Au, and Pb, and the oxygen within the MgO, to generate an oxide of the one or more elements described above, thereby deteriorating the (001) orientation of the magnetic layer.

SUMMARY OF THE INVENTION

Accordingly, it is an object in one aspect of the embodiments of the present invention to provide a magnetic recording medium capable of improving the (001) orientation of the magnetic layer, a magnetic storage apparatus including such a magnetic recording medium, and a method of manufacturing such a magnetic recording medium.

According to one aspect of the embodiments of the present invention, a magnetic recording medium includes a substrate; an upper underlayer provided above the substrate; and a first magnetic layer provided on and in contact with the upper underlayer, wherein the upper underlayer includes a compound represented by a general formula $MgO_{(1-x)}$, where x falls within a range of 0.07 to 0.25, wherein the first magnetic layer includes an alloy having a $L1_0$ structure, and wherein the alloy having the $L1_0$ structure includes one or more elements selected from a group consisting of Al, Si, Ga, and Ge.

According to another aspect of the embodiments of the present invention, a magnetic storage apparatus includes the magnetic recording medium described above; and a magnetic head configured to write information to and read information from the magnetic recording medium.

According to still another aspect of the embodiments of the present invention, a method of manufacturing the magnetic recording medium described above includes forming the upper underlayer with a sputtering target that includes MgO and a sputtering gas in which hydrogen is added to an inert gas in the range of 1 vol % to 20 vol %.

According to a further aspect of the embodiments of the present invention, a method of manufacturing the magnetic recording medium described above includes performing a discharge using a sputtering target that includes MgO for 0.5 second or less at a sputtering gas pressure of 1 Pa or higher; and performing a discharge at a sputtering gas pressure of 0.5 Pa or lower, to form the upper underlayer.

Other objects and further features of the present invention will be apparent from the following detailed description when read in conjunction with the accompanying drawings.

BRIEF DESCRIPTION OF THE DRAWINGS

FIG. 4 is a table illustrating evaluation results of the (001) orientation of the magnetic layer of the magnetic recording media according to exemplary implementations and comparative examples.

DESCRIPTION OF THE PREFERRED EMBODIMENTS

Figure 1:
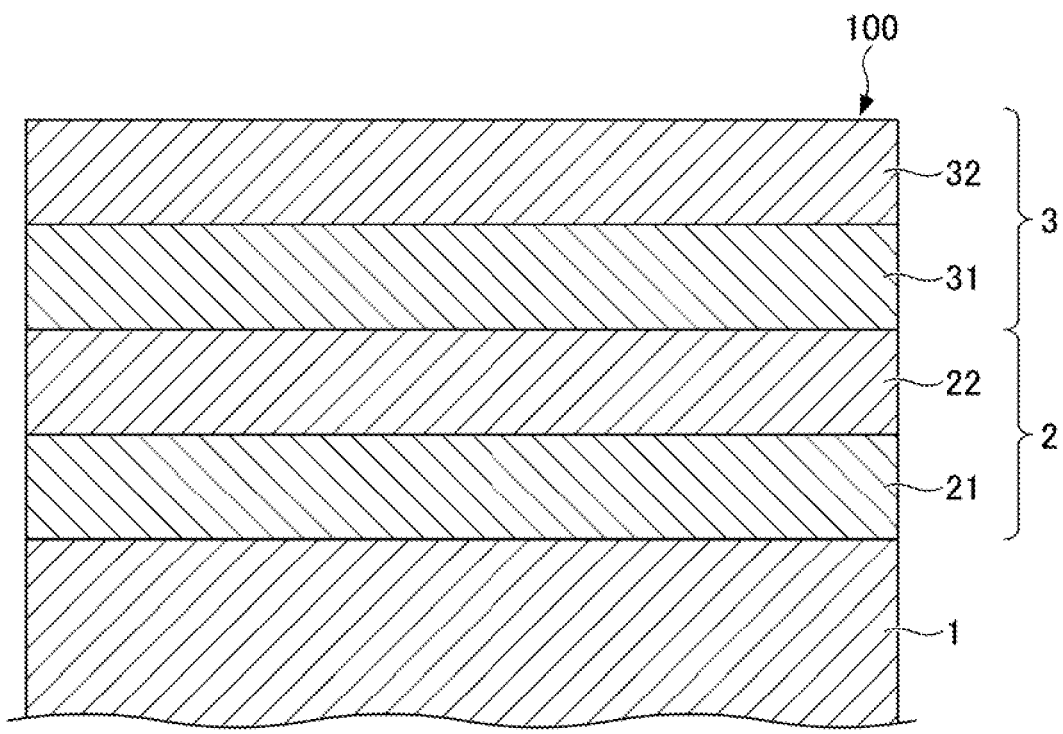
FIG. 1 is a cross sectional view illustrating an example of a layer structure of a magnetic recording medium according to one embodiment of the present embodiment.

Embodiments of the present invention will be described in detail with reference to the drawings. For the sake of convenience, some parts may be illustrated on an enlarged scale in the drawings to facilitate understanding thereof. Hence, dimensional ratios of the various parts in the drawings may differ from the actual dimensional ratios of the various parts. In addition, the materials, the dimensions, or the like illustrated and described in the following are merely examples.

Magnetic Recording Medium

FIG. 1 illustrates an example of the layer structure of a magnetic recording medium according to one embodiment. A magnetic recording medium 100 illustrated in FIG. 1 includes a substrate 1, an underlayer 2, and a magnetic layer 3, which are laminated in this order. The magnetic layer 3 includes an alloy having a $L1_0$ structure.

The underlayer 2 includes a first underlayer 21, and a second underlayer 22 that are successively laminated on the substrate 1. The magnetic layer 3 includes a first magnetic layer 31, and a second magnetic layer 33 that are successively laminated on second underlayer 22 of the underlayer 2.

The number of laminated layers forming each of the underlayer 2 and the magnetic layer 3 is not particularly limited, and each of the under layer 2 and the magnetic layer 3 may be formed by three or more laminated layers.

The second underlayer 22 is an uppermost layer of the underlayer 2, that is, the layer farthest away from the substrate 1. The second underlayer 22 includes a compound represented by the following general formula [1], where x falls within a range of 0.07 to 0.25.

$MgO_{(1-x)}$            [1]

The first magnetic layer 31 is a lowermost layer of the magnetic layer 3, that is, the layer closest to the substrate 1. The first magnetic layer 31 includes an alloy having the $L1_0$ structure. This alloy having the $L1_0$ structure includes one or more elements selected from a group consisting of Al, Si, Ga, and Ge.

Because the second underlayer 22 makes contact with the first magnetic layer 31, interdiffusion between oxygen within the second underlayer 22 and the one or more elements selected from the group consisting of Al, Si, Ga, and Ge in the first magnetic layer 31 is reduced, thereby improving the (001) orientation of the magnetic layer 3. The interdiffusion is reduced because the second underlayer 22 is in an oxygen-deficient state with respect to the stoichiometry (or stoichiometric composition) of MgO, such that supply of oxygen to the first magnetic layer 31 is reduced, and oxidation of the one or more elements in the alloy having the $L1_0$ structure and forming the first magnetic layer 31 is reduced.

In the compound represented by the general formula [1] described above, x falls within the range of 0.07 to 0.25, but more preferably falls within a range of 0.10 to 0.20. If x is less than 0.07, the one or more elements selected from the group consisting of Al, Si, Ga, and Ge, included in the alloy having the $L1_0$ structure and forming the first magnetic layer 31, may become partially oxidized to generate an oxide of the one or more elements. Consequently, in this case, the oxide of the one or more elements moves to the grain boundaries, thereby deteriorating the (001) orientation of the magnetic layer 3. On the other hand, if x is greater than 0.25, a lattice constant of the compound represented by the general formula [1] and included in the second underlayer 22 becomes small, and a c-axis preferred orientation of the alloy having the $L1_0$ structure and included in the first magnetic layer 31 deteriorates. Hence, in this case, the (001) orientation of the magnetic layer 3 deteriorates.

The second underlayer 22 may be deposited by sputtering.

The second underlayer 22 is preferably deposited using a sputtering target including MgO, and a sputtering gas in which hydrogen is added to an inert gas in a range of 1 volume percent (vol %) to 20 vol %. In this case, it is possible to reduce the MgO, and deposit a layer including the oxygen-deficient magnesium oxide, that is, the compound represented by the general formula [1].

When depositing the second underlayer 22, it is preferable to use a sputtering target including MgO and perform a discharge for a time of 0.5 second or less at a sputtering gas pressure of 1 Pa or higher, and thereafter perform a discharge at a sputtering gas pressure of 0.5 Pa or lower.

Because MgO is an insulator, the RF sputtering is employed when depositing the second underlayer 22. However, by performing the discharge for the time of 0.5 seconds or less at the sputtering gas pressure of 1 Pa or higher, it becomes possible to perform the discharge at the sputtering gas pressure of 0.5 Pa or lower. For this reason, it is possible to deposit a layer including a highly crystalline and oxygen-deficient magnesium oxide.

In addition, by performing the discharge at the sputtering gas pressure of 0.5 Pa or lower, it is possible to stably deposit the layer including the oxygen-deficient magnesium oxide. The reason why the layer including the oxygen-deficient magnesium oxide can be stably deposited is described in the following. In other words, due to the discharge, oxygen atoms separated from Mg recombine with oxygen atoms to generate oxygen molecules, but a part of the oxygen molecules usually adhere to a chamber wall. If the sputtering gas pressure is 0.5 Pa or lower, the amount of oxygen molecules released from the chamber wall is small, and thus, the magnesium oxide can be put into the oxygen-deficient state.

Preferably, the alloy having the $L1_0$ structure and forming the first magnetic layer 31 further includes Fe or Co, and Pt.

A content of the one or more elements selected from the group consisting of Al, Si, Ga, and Ge in the alloy having the $L1_0$ structure is preferably in a range of 2 mole percent (mol %) to 20 mol %, more preferably in a range of 2.5 mol % to 10 mol %. If the content of the one or more elements in the alloy having the $L1_0$ structure is 2 mol % or more, it is possible to improve the (001) orientation of the magnetic layer 3. On the other hand, if the content of the one or more elements in the alloy having the $L1_0$ structure is 20 mol % or less, it is possible to improve magnetization of the magnetic particles forming the first magnetic layer 31, and as a result, it is possible improve a magnetic recording signal strength of the magnetic recording medium 100.

The first magnetic layer 31 may further include a grain boundary segregation material, and have a granular structure. In this case, it is possible to facilitate the (001) orientation of the first magnetic layer 31, and improve the lattice matching between the first magnetic layer 31 and the (100) oriented second underlayer 22.

Examples of the grain boundary segregation material included in the first magnetic layer 31 include nitrides such as VN, BN, SiN, TiN, or the like, carbides such as C, VC, or the like, and borides such as BN or the like, for example. Two or more kinds of such materials may be used together to form the grain boundary segregation material of the first magnetic layer 31.

Examples of the material forming the first underlayer 21 include, but are not limited to (100) oriented W, Cr, Cr alloys having a BCC structure, alloys having a B2 structure, or the like, for example, provided that the first magnetic layer 31 can be made (001) oriented.

Examples of the Cr alloys having the BCC structure include CrMn alloys, CrMo alloys, CrW alloys, CrV alloys, CrTi alloys, CrRu alloys, or the like, for example.

Examples of the alloys having the B2 structure include RuAl alloys, NiAl alloys, or the like, for example.

In a case where three or more layers are laminated in the underlayer 2, the lower underlayer other than the upper, second underlayer 22 may be similar to the first underlayer 21.

The second magnetic layer 32 preferably includes an alloy having an $L1_0$ structure. In this case, it is possible to improve the (001) orientation of the magnetic layer 3. In other words, as the second magnetic layer 32, it is possible to epitaxially grow a magnetic layer in alignment with the orientation of the first magnetic layer 31.

The alloy having an $L1_0$ structure included in the second magnetic layer 32 may or may not include the one or more elements selected from the group consisting of Al, Si, Ga, and Ge.

The alloy having the $L1_0$ structure and forming the second magnetic layer 32 preferably includes Fe or Co, and Pt.

The second magnetic layer 32 may further include a grain boundary segregation material, and have a granular structure.

Examples of the grain boundary segregation material included in the second magnetic layer 32 include nitrides such as VN, BN, SiN, TiN, or the like, carbides such as C, VC, or the like, borides such as BN or the like, and oxides such as $SiO_2$, $TiO_2$, $Cr_2O_3$, $Al_2O_3$, $Ta_2O_5$, $ZrO_2$, $Y_2O_3$, $CeO_2$, MnO, TiO, ZnO, or the like, for example. Two or more kinds of such materials may be used together to form the grain boundary segregation material of the second magnetic layer 32.

In a case where the number of laminated layers forming the magnetic layer 3 is three or more, the magnetic layer or layers other than the first magnetic layer 31 may be the same as the second magnetic layer 32.

The magnetic recording medium 100 preferably includes a protection layer (not illustrated) formed on the magnetic layer 3.

Examples of the method of depositing the protection layer include Radio Frequency-Chemical Vapor Deposition (RF-CVD), Ion Beam Deposition (IBD), Filtered Cathodic Vacuum Arc (FCVA), or the like, for example. The RF-CVD decomposes a source gas made of hydrocarbon by high-frequency plasma to deposit the protection layer. The IBD ionizes the source gas by electrons emitted from a filament to deposit the protection layer. The FCVA deposits the protection layer using a solid carbon target, without using a source gas.

The protection layer preferably has a thickness of 1 nm to 6 nm, for example. A satisfactory floating characteristic of the magnetic head is obtained if the thickness of the protection layer is 1 nm or greater, and a magnetic spacing becomes small and a Signal-to-Noise Ratio (SNR) of the magnetic recording medium 100 improves if the thickness of the protection layer is 6 nm or less.

The magnetic recording medium 100 may further include a lubricant layer (not illustrated) formed on the protection layer.

Examples of a lubricant forming the lubricant layer include fluororesins, such as perfluoropolyether, or the like, for example.

Layers other than the layers described above, such as a seed layer, a bonding layer, or the like, may be additionally provided in the magnetic recording medium 100, as required.

Magnetic Storage Apparatus

A magnetic storage apparatus according to one embodiment is not particularly limited as long as the magnetic storage apparatus includes one or a plurality of magnetic recording media according to the embodiment described above.

For example, the magnetic storage apparatus according to this embodiment includes a driving mechanism that drives the magnetic recording medium to rotate in a recording direction, and a magnetic head having a near-field light generator (or near-field light generating element) provided on a tip end thereof. The magnetic storage apparatus further includes a head moving mechanism that moves the magnetic head, and a signal processor that processes signals that are input to the magnetic head to be recorded on the magnetic recording medium, and processes signals that are reproduced from the magnetic recording medium by the magnetic head and output from the magnetic head.

The magnetic head further has a laser generator that generates laser light for heating the magnetic recording medium, and a waveguide that guides the laser light generated from the laser generator to the near-field light generator.

Figure 2:
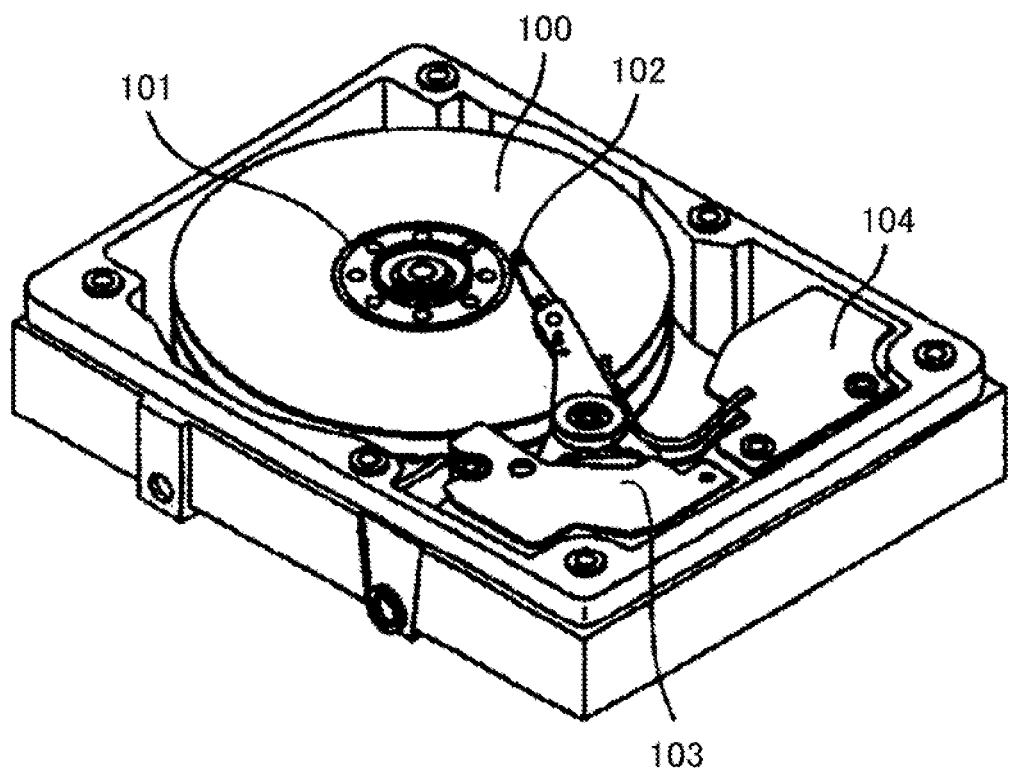
FIG. 2 is a perspective view illustrating an example of a magnetic storage apparatus according to one embodiment of the present invention.

FIG. 2 illustrates an example of the magnetic storage apparatus according to this embodiment.

The magnetic storage apparatus illustrated in FIG. 2 includes one or a plurality of magnetic recording media 100, a driving mechanism 101 that drives the magnetic recording medium 100 to rotate, a magnetic head 102, a head moving mechanism 103 that moves the magnetic head 102, and a signal processor 104. The signal processor 104 processes signals that are input to the magnetic head 102 to be recorded on the magnetic recording medium 100, and processes signals that are reproduced from the magnetic recording medium 100 by the magnetic head 102 and output from the magnetic head 102. For example, the magnetic recording medium 100 may have a disk shape, and in this case, the magnetic storage apparatus may form a Hard Disk Drive (HDD).

Figure 3:
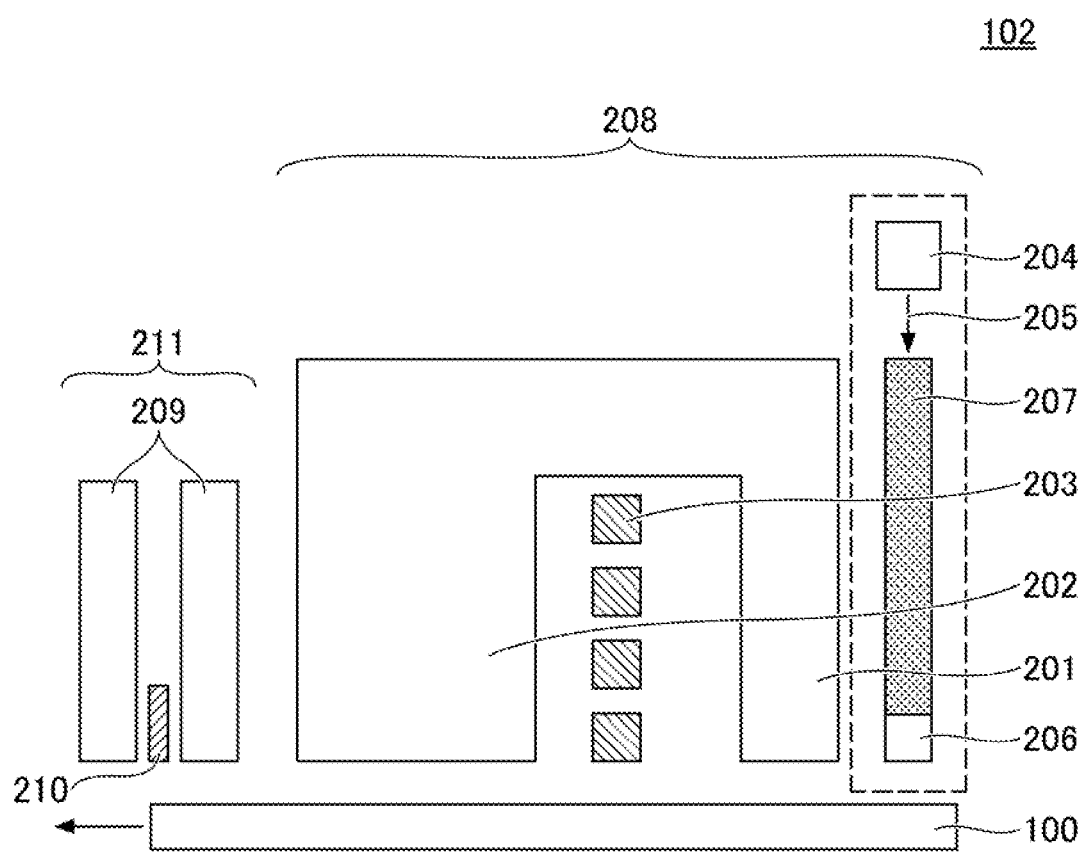
FIG. 3 is a diagram schematically illustrating an example of a magnetic head of the magnetic storage apparatus illustrated in FIG. 2.

An example of the magnetic head 102 is illustrated in FIG. 3.

The magnetic head 102 includes a recording (or write) head 208 that records (or writes) signals to a corresponding one of the plurality of magnetic recording media 100, and a reproducing (or read) head 211 that reproduces (or reads) signals from the corresponding one of the plurality of magnetic recording media 100.

The recording head 208 includes a main magnetic pole 201, an auxiliary magnetic pole 202, a coil 203 that generates a magnetic field, a laser diode 204 that is an example of the laser generator and generates laser light 205, a near-field light generator (or near-field light generating element) 206 that generates near-field light for heating the magnetic recording medium 100, and a waveguide 207. The waveguide 207 guides the laser light 205 generated from the laser diode 204 to the near-field light generator 206 that is provided on a tip end of the magnetic head 102.

The reproducing head 211 includes a reproducing element 210, such as a TMR (Tunneling Magneto-Resistive) element or the like, for example, that is sandwiched between a pair of shields 209.

EXEMPLARY IMPLEMENTATIONS

Next, exemplary implementations according to the present invention will be described. The present invention is not limited to these exemplary implementations, and various variations and modifications may be made without departing from the scope of the present invention. In the following, "at %" represents "atomic percent".

Exemplary Implementation I1-1

A 50 at % Cr-50 at % Ti alloy layer (first underlayer) having a thickness of 50 nm, and a 75 at % Co-20 at % Ta-5 at % Ta-5 alloy layer (soft magnetic underlayer) having a thickness of 25 nm are formed in this order on a heat-resistant glass substrate. Next, after the substrate is heated to 250° C., a Cr layer (second underlayer) having a thickness of 10 nm is formed on the 75 at % Co-20 at % Ta-5 at % Ta-5 alloy layer (soft magnetic underlayer). A DC magnetron sputtering apparatus is used to form the first underlayer, the soft magnetic underlayer, and the second underlayer.

Next, an RF sputtering apparatus is used to form a third underlayer on the Cr layer (second underlayer). More particularly, after performing the discharge for 0.3 second at the sputtering gas pressure of 3 Pa, the discharge is performed for 12 seconds at the sputtering gas pressure of 0.1 Pa, to form a $MgO_{(1-x)}$ layer (third underlayer) to a thickness of 2 nm. In this case, MgO is used as the sputtering target, and argon is used as the sputtering gas.

Next, after heating the substrate to 520° C., a 60 mol % (47.5 at % Fe-47.5 at % Pt-5 at % Ge)-40 mol % C layer (first magnetic layer) having a thickness of 3 nm, and a 82 mol % (52 at % Fe-48 at % Pt)-18 mol % $SiO_2$ layer (second magnetic layer) having a thickness of 5 nm are formed in this order on the $MgO_{(1-x)}$ layer (third underlayer). In this case, the DC magnetron sputtering apparatus is used to form the first magnetic layer and the second magnetic layer.

Next, a carbon layer (protection layer) having a thickness of 3 nm is formed on the 82 mol % (52 at % Fe-48 at % Pt)-18 mol % $SiO_2$ layer (second magnetic layer) by the IBD, and a perfluoropolyether film (lubricant layer) is formed on the carbon layer (protection layer) by a coating method, thereby obtaining the magnetic recording medium.

Exemplary Implementations I1-2 to I3-3

The magnetic recording medium is manufactured similar to the exemplary implementation I1-1, except that deposition conditions of the third underlayer and the first magnetic layer are changed from those of the exemplary implementation I1-1, as illustrated in FIG. 4.

The sputtering gas pressures for the Exemplary Implementations I1-1 to I3-3 illustrated in FIG. 4 is the sputtering gas pressure when discharging for 12 seconds after discharging at 3 Pa for 0.3 second.

Exemplary Implementation I4-1

The magnetic recording medium is manufactured similar to the exemplary implementation I1-1, except that the third underlayer is formed as follows using the RF sputtering apparatus.

More particularly, the discharge is performed at a sputtering gas pressure of 3 Pa for 12 seconds, to form the $MgO_{(1-x)}$ layer having a thickness of 2 nm. In this case, MgO is used as the sputtering target, and argon including 1 vol % hydrogen is used as the sputtering gas.

Exemplary Implementations I4-2 to I7-4, and Comparative Examples C1-1 to C5-2

The magnetic recording medium is manufactured similar to the exemplary implementation I4-1, except that deposition conditions of the third underlayer and the first magnetic layer are changed from those of the exemplary implementation I4-1, as illustrated in FIG. 4.

(001) Orientation of Magnetic Layer

The X-ray diffraction spectrum of the substrate after forming the second magnetic layer is measured using an X-ray diffractometer system (manufactured by Philips N.V., for example) to determine the half width of the (200) peak of the FePt alloy.

In FIG. 4, the (001) orientation of the magnetic layer is evaluated using the half width of the (200) peak of the FePt alloy having the $L1_0$ structure and included in the magnetic layer. The (001) peak of the FePt alloy is not sufficiently large at an appearance angle 2θ. For this reason, even if the lower angle side is extended to the measurement limit when measuring the rocking curve, the intensity of the (001) peak of the FePt alloy is not stable with respect to a case where the peak does not exist, and it is difficult to analyze the half width. Due to these measurement related reasons, it is difficult to evaluate the (001) orientation of the magnetic layer using the half width of the (001) peak of the FePt alloy. On the other hand, the (200) peak of the FePt alloy appears when orienting the FePt alloy to have the (001) orientation, and is suitable for evaluating the (001) orientation of the magnetic layer because the appearance angle 2θ thereof is sufficiently large.

FIG. 4 illustrates the evaluation results of the (001) orientation of the magnetic layer of the magnetic recording medium according to the exemplary implementations and the comparative examples.

From FIG. 4, it is confirmed that the magnetic recording media according to the exemplary implementations I1-1 to I7-4 have a small half width of the (200) peak of the FePt alloy, and have an excellent (001) orientation of the magnetic layer.

On the other hand, because the magnetic recording media according to the comparative examples C1-1 to C4-2 have the third underlayer with an x that 0 to 0.05, the half width of the (200) peak of the FePt alloy is large, and the (001) orientation of the magnetic layer (001) is poor.

In addition, because the magnetic recording media according to the comparative examples C5-1 and C5-2 have the third underlayer with an x of 0 to 0.05, and the first magnetic layer does not include Al, Si, Ga, or Ge, the half width of the (200) peak of the FePt alloy is large, and the (001) orientation of the magnetic layer (001) is poor.

According to the present disclosure, it is possible to provide a magnetic recording medium capable of improving the (001) orientation of the magnetic layer, a magnetic storage apparatus including such a magnetic recording medium, and a method of manufacturing such a magnetic recording medium.

Further, the present invention is not limited to these embodiments and exemplary implementations, but various variations, modifications, and substitutions may be made without departing from the scope of the present invention.

What is claimed is:

1. A magnetic recording medium comprising:
    a substrate;
    an underlayer including an upper underlayer provided above the substrate; and
    a first magnetic layer provided on and in contact with the upper underlayer,
    wherein the upper underlayer includes a compound represented by a general formula $MgO_{(1-x)}$, where x falls within a range of 0.07 to 0.25,
    wherein the first magnetic layer includes an alloy having a $L1_0$ structure, and
    wherein the alloy having the $L1_0$ structure includes one or more elements selected from a group consisting of Al, Si, Ga, and Ge.

2. The magnetic recording medium as claimed in claim 1, wherein the alloy having the $L1_0$ structure further includes Fe or Co, and Pt.

3. The magnetic recording medium as claimed in claim 1, wherein a content of the one or more elements selected from the group consisting of Al, Si, Ga, and Ge in the alloy having the $L1_0$ structure is in a range of 2 mol % to 20 mol %.

4. The magnetic recording medium as claimed in claim 1, wherein a content of the one or more elements selected from the group consisting of Al, Si, Ga, and Ge in the alloy having the $L1_0$ structure is in a range of 2.5 mol % to 10 mol %.

5. The magnetic recording medium as claimed in claim 1, wherein
    the upper the underlayer further includes one or more lower underlayers provided under the upper underlayer, wherein each of the one or more lower underlayers includes a material that makes the first magnetic layer (001) oriented.

6. The magnetic recording medium as claimed in claim 5, wherein the material included in each of the one or more lower underlayers is selected from a group consisting of (100) oriented W, Cr, Cr alloys having a BCC structure, and alloys having a B2 structure.

7. The magnetic recording medium as claimed in claim 6, wherein the Cr alloys having the BCC structure include CrMn alloys, CrMo alloys, CrW alloys, CrV alloys, CrTi alloys, and CrRu alloys.

8. The magnetic recording medium as claimed in claim 6, wherein the alloys having the B2 structure include RuAl alloys, and NiAl alloys.

9. The magnetic recording medium as claimed in claim 1, wherein
    the first magnetic layer further includes a grain boundary segregation material, and has a granular structure, and
    the grain boundary segregation material includes one or more elements selected from a group consisting of nitrides including VN, BN, SiN, and TiN, carbides including C and VC, and borides including BN.

10. The magnetic recording medium as claimed in claim 9, wherein
    the underlayer further includes one or more lower underlayers provided under the upper underlayer, and
    the one or more lower underlayers includes a material selected from a group consisting of (100) oriented W, Cr, Cr alloys having a BCC structure, and alloys having a B2 structure.

11. The magnetic recording medium as claimed in claim 9, further comprising:
    a plurality of magnetic layers including the first magnetic layer, and one or more second magnetic layers provided on the first magnetic layer,
    wherein the one or more second magnetic layers includes an alloy having a $L1_0$ structure.

12. A magnetic storage apparatus comprising:
    the magnetic recording medium according to claim 1; and
    a magnetic head configured to write information to and read information from the magnetic recording medium.

13. A method of manufacturing the magnetic recording medium according to claim 1, comprising:
    forming the upper underlayer with a sputtering target that includes MgO and a sputtering gas in which hydrogen is added to an inert gas in the range of 1 vol % to 20 vol %.

14. A method of manufacturing the magnetic recording medium according to claim 1, comprising:
    performing a discharge using a sputtering target that includes MgO for 0.5 second or less at a sputtering gas pressure of 1 Pa or higher; and
    performing a discharge at a sputtering gas pressure of 0.5 Pa or lower, to form the upper underlayer.

* * * * *